US008395805B2

(12) United States Patent
Sato

(10) Patent No.: US 8,395,805 B2
(45) Date of Patent: Mar. 12, 2013

(54) INFORMATION PROCESSING APPARATUS RELATED TO ELECTRONIC STICKY NOTE, DOCUMENT PROCESSING APPARATUS, PRINTING APPARATUS AND MEDIA STORING PROGRAMS

(75) Inventor: Tadaaki Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1668 days.

(21) Appl. No.: 11/583,017

(22) Filed: Oct. 19, 2006

(65) Prior Publication Data
US 2007/0285721 A1 Dec. 13, 2007

(30) Foreign Application Priority Data

Jun. 13, 2006 (JP) ................... 2006-163191

(51) Int. Cl.
G06K 15/00 (2006.01)
H04N 1/00 (2006.01)
(52) U.S. Cl. ........................ 358/1.18; 358/1.1
(58) Field of Classification Search .................. 358/1.1, 358/1.8, 1.13, 1.14, 1.15, 1.18, 473; 709/283; 715/230, 232, 512, 541
See application file for complete search history.

(56) References Cited

U.S. PATENT DOCUMENTS

| 5,778,403 A * | 7/1998 | Bangs | 715/210 |
| 5,825,996 A * | 10/1998 | Davis et al. | 358/1.18 |
| 6,169,544 B1 * | 1/2001 | Onoda | 715/723 |
| 6,437,876 B1 * | 8/2002 | Phang et al. | 358/1.2 |
| 7,647,555 B1 * | 1/2010 | Wilcox et al. | 715/721 |
| 2001/0043359 A1 * | 11/2001 | Mori et al. | 358/1.15 |
| 2002/0138476 A1 * | 9/2002 | Suwa et al. | 707/3 |
| 2003/0063136 A1 * | 4/2003 | J'maev | 345/864 |
| 2004/0143796 A1 * | 7/2004 | Lerner et al. | 715/538 |
| 2005/0223315 A1 * | 10/2005 | Shimizu et al. | 715/512 |
| 2007/0013950 A1 * | 1/2007 | Kajihara | 358/1.18 |
| 2009/0207424 A1 * | 8/2009 | Yamada | 358/1.2 |

FOREIGN PATENT DOCUMENTS

| JP | 07-121510 A | 5/1995 |
| JP | 08-292755 A | 11/1996 |
| JP | 08-292861 A | 11/1996 |
| JP | 08292755 A * | 11/1996 |
| JP | 2003-85161 A | 3/2003 |
| JP | 2005-309538 A | 11/2005 |

OTHER PUBLICATIONS

Heidi Steele—Sams Teach Yourself Microsoft Office Word 2003 in 24 Hours, Sep. 2003, p. 45, Sams Publishing.*
Japanese Office Action in counterpart application No. JP 2006-163191, dated Jun. 7, 2011.

* cited by examiner

Primary Examiner — Gabriel Garcia
(74) Attorney, Agent, or Firm — Sughrue Mion, PLLC

(57) ABSTRACT

An information processing apparatus includes an area specifying unit that specifies a print area to be printed on a print medium in a page of a document, and a processing controller that controls processing related to an electronic sticky note, in correspondence with a portion running off the print area in the electronic sticky note attached to the page, to arrange a description held in the electronic sticky note within the print area.

14 Claims, 6 Drawing Sheets

| PAGE ID | PAGE SIZE | MARGIN |
|---|---|---|
| ... | | |

F I G. 2

| STICKY NOTE ID | PAGE ID | POSITION COORDINATES | STICKY NOTE SIZE |
|---|---|---|---|
| DESCRIPTION DATA | | | |
| ... | | | |

F I G. 3

FIG. 9
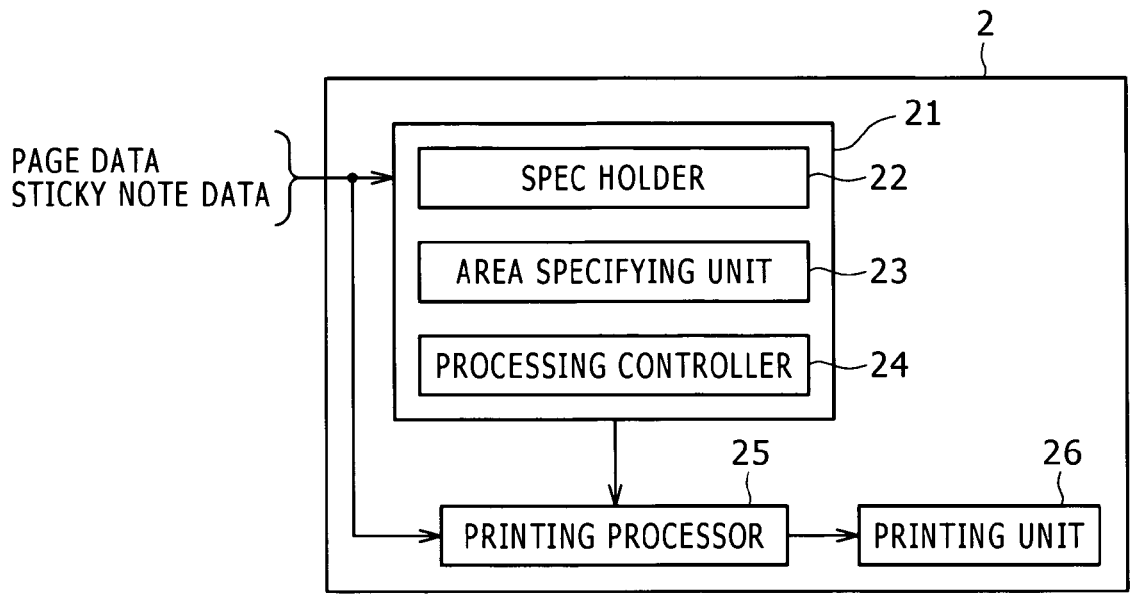
FIG. 10A
RELATED ART
FIG. 10B
RELATED ART
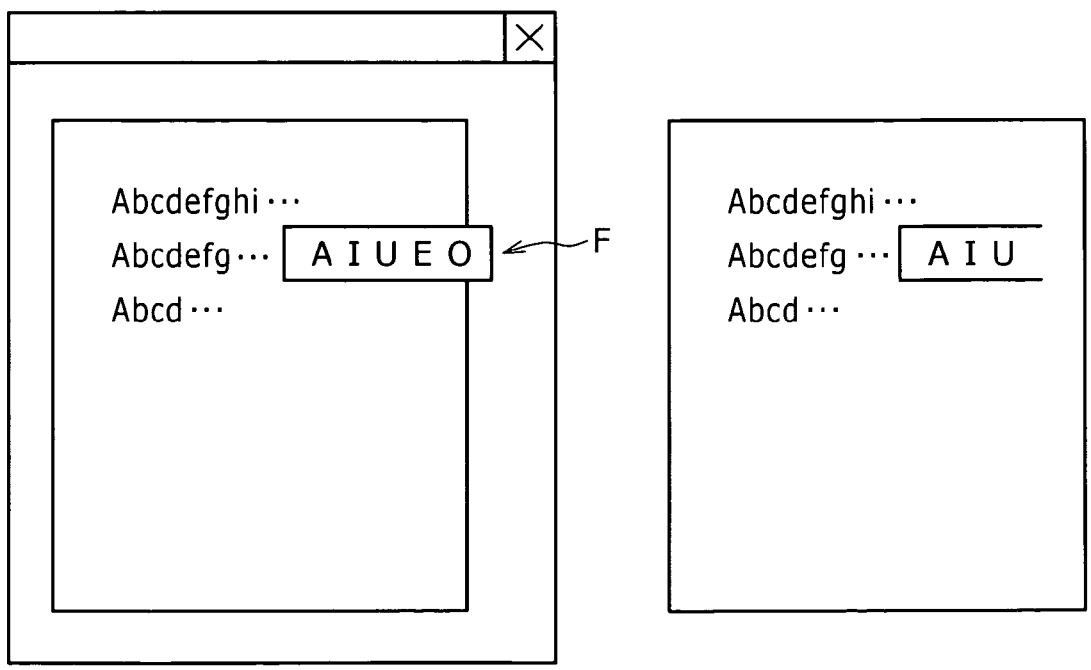

INFORMATION PROCESSING APPARATUS RELATED TO ELECTRONIC STICKY NOTE, DOCUMENT PROCESSING APPARATUS, PRINTING APPARATUS AND MEDIA STORING PROGRAMS

BACKGROUND

1. Technical Field

The present invention relates to an information processing apparatus which controls processing related to an electronic sticky note attached to a page in an electronic document, a document processing apparatus having the control function, a printing apparatus having the control function, and media storing programs to realize these apparatuses with a computer.

2. Related Art

In recent years, a document processing apparatus which performs browsing, editing and the like of an electronic document generated using a computer, is provided with a function of attaching an electronic sticky note to a page in the electronic document. For example, an electronic sticky note describing a comment on a document to be used in a document review or the like may be attached to a corresponding portion in a page of the document.

SUMMARY

According to an aspect of the invention, there is provided an information processing apparatus including: an area specifying unit that specifies a print area to be printed on a print medium in a page of a document; and a processing controller that controls processing related to an electronic sticky note, in correspondence with a portion running off the print area in the electronic sticky note attached to the page, to arrange a description held in the electronic sticky note in the print area.

BRIEF DESCRIPTION OF THE DRAWINGS

Exemplary embodiments of the present invention will be described in detail based on the following figures, wherein:

FIG. 2 is a table showing page data according to the exemplary embodiment of the present invention;

FIG. 3 is a table showing sticky note data according to the exemplary embodiment of the present invention;

FIG. 9 is a block diagram showing the construction of a printer according to another exemplary embodiment of the present invention; and FIGS. 10A and 10B are explanatory views of printing of a page to which an electronic sticky note is attached according to a conventional method.

DETAILED DESCRIPTION

The present invention will be particularly described with reference to an exemplary embodiment.

Figure 1:
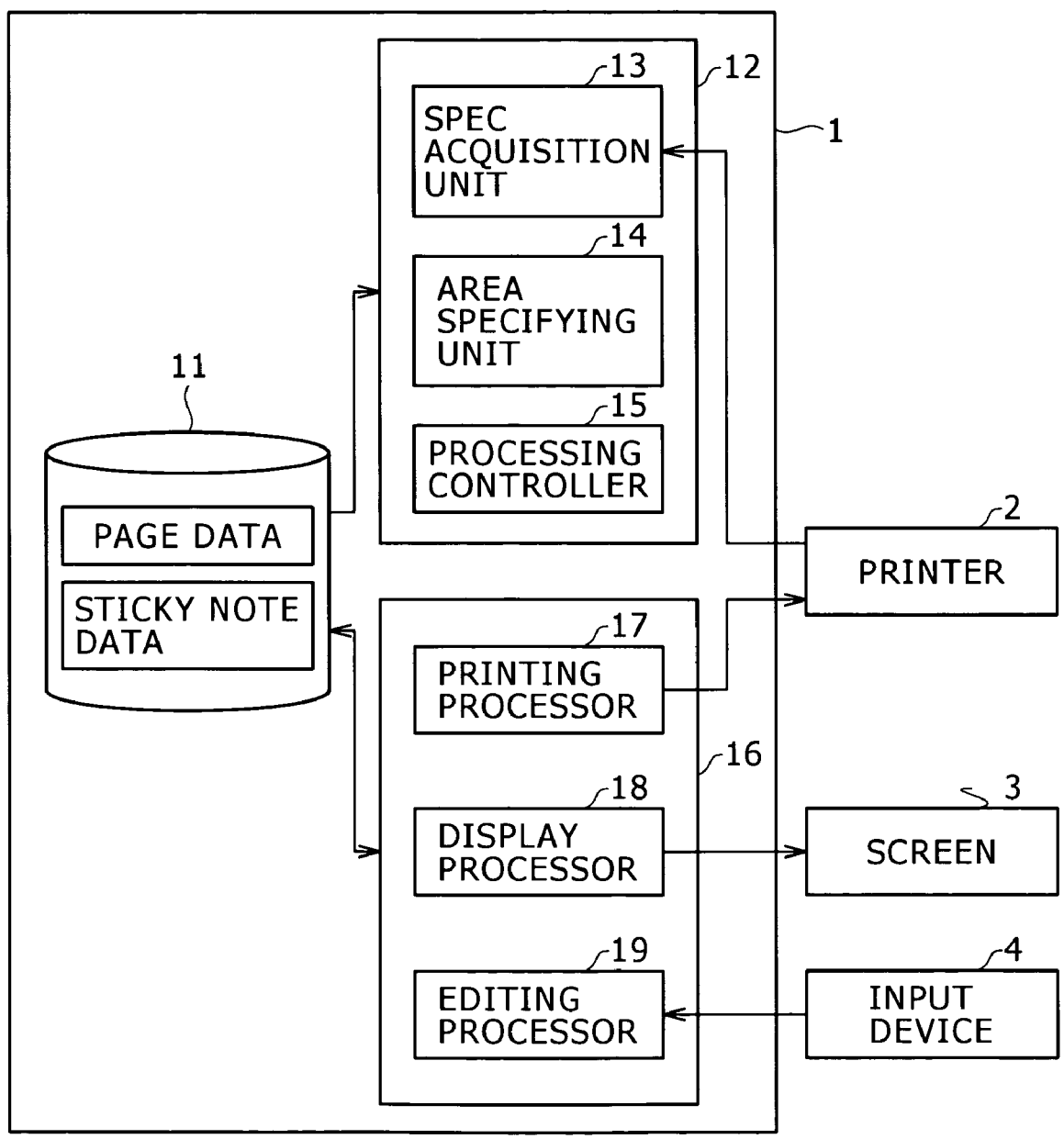
FIG. 1 is a block diagram showing the construction of a document processing apparatus according to an exemplary embodiment of the present invention.

FIG. 1 is a block diagram showing the construction of a document processing apparatus 1 according to the exemplary embodiment. The document processing apparatus 1 is provided with a printer 2 which prints a document based on print information supplied from the document processing apparatus 1, a screen 3 having a liquid crystal display or the like which displays a document, and an input device 4, having an input devices such as a keyboard and a mouse, which receives a user's operation with respect to a document.

The document processing apparatus 1 has a data holder 11 which holds document data, a sticky note controller 12 which performs control regarding an electronic sticky note (hereinbelow, simply referred to as a "sticky note") in a document, and a document processor 16 which performs display, editing and print processing on the document and the sticky note in the document. In the present exemplary embodiment, the sticky note controller 12 and the document processor 16 perform processing on document data in the data holder 11 of the document processing apparatus 1, however, it may be arranged such that document data, held in another device such as a document server, is obtained and processed.

The document data includes page data as information on each page of a document, sticky note data as information on a sticky note attached to each page, and the like.

As shown in FIG. 2, the page data holds information such as "page ID" to identify each page in the document, "page size" indicating the size of paper on which the page is to be printed and "margin" indicating the size of margin along the respective sides of the page.

As shown in FIG. 3, the sticky note data has information such as "sticky note ID" to identify each sticky note, "page ID" to identify a page to which the sticky note is attached, "position coordinates" indicating the position on the page in which the sticky note is attached, "sticky note size" indicating the size of the sticky note and "description data" described in the sticky note.

The document processor 16 has a printing processor 17 which performs processing to generate print information to print a page in a document and a sticky note attached to the page and supply the information to the printer 2, a display processor 18 which performs processing to display the page in the document and the sticky note attached to the page on the screen 3, and an editing processor 19 which performs processing to edit data in the page in the document and the sticky note attached to the page in correspondence with a user's operation received by the input device 4.

The sticky note controller 12 has a spec acquisition unit 13 which obtains print spec of the printer 2, an area specifying unit 14 which specifies a print area based on the obtained print spec and a page size, and a processing controller 15 which controls the printing controller 17 in correspondence with a portion without the specified print area.

The spec acquisition unit 13 obtains information on an unprintable area caused by a mechanical factor of the printer 2, as print spec, from the printer 2. In the present exemplary embodiment, information indicating that an area 2 mm from the ends of print sheet is an unprintable area. Note that when a printer which is capable of printing on the entire range of the print sheet, the spec acquisition unit 13 may be omitted.

The area specifying unit 14 specifies a print area based on the print spec obtained by the spec acquisition unit 13 and the margin in the page data. That is, the smaller one of the area defined by the print spec and the area defined by the margin is adopted as the print area.

For example, when the margin is set to 1 mm, an area except an area having a width of 2 mm from the respective sides of the page (print spec) is specified as a print area. Further, when the margin is set to 3 mm, an area except an area having a width of 3 mm from the respective sides of the page is specified as a print area. Note that when different margins are set along the respective sides, a print area is specified in correspondence with the respective values. Further, when the spec acquisition unit 13 is omitted, the print area is specified from the margin. When the margin is not set, the print area is specified from the print spec.

The processing controller 15 calculates the border of the print area, from which a sticky note attached to the page runs off the print area, based on the sticky note data and the specified print area. Then the processing controller 15 controls the printing processor 17 based on the border to perform printing by the printer 2 in a state where the description in the sticky note is included within the print area. In the present exemplary embodiment, print information where the description in a portion outside the border is moved to empty space in the print area in the sticky note is generated, and the information is supplied to the printer 2. When there is not sufficient empty space into which the portion outside the border is moved, the character size of the description is reduced so as to ensure empty space, then the description outside the border is moved into the print area.

Figure 4:
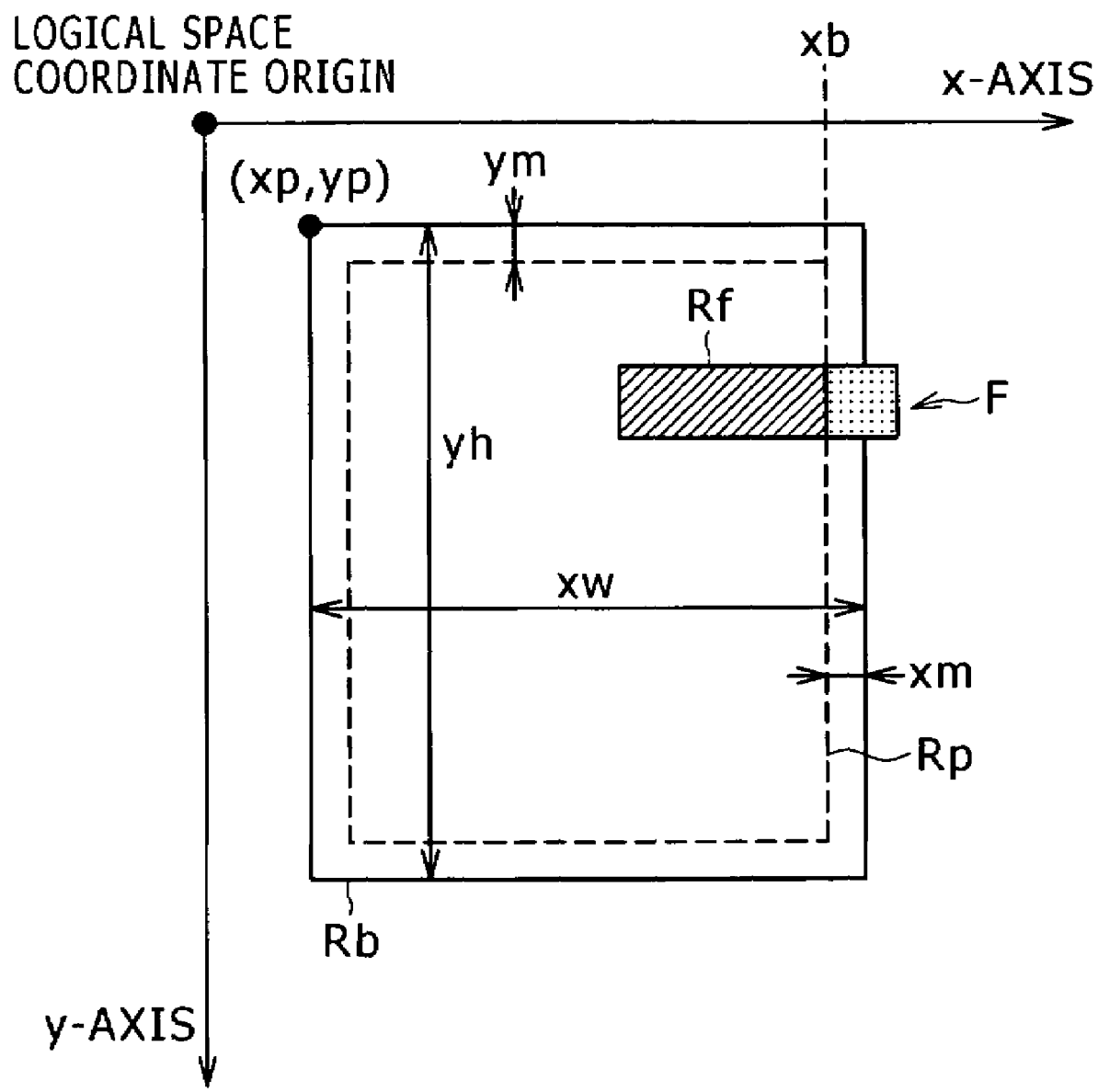
FIG. 4 is a graph showing border calculation processing according to the exemplary embodiment of the present invention.

FIG. 4 shows the relation between a page and a sticky note in the page on a logical space coordinate graph. Next, calculation processing of the border of the print area from which a sticky note runs off will be described using this figure.

In FIG. 4, a print sheet as a print medium, denoted by Rb, is specified based on the page size in the page data. An area defined by xw in x-axis direction (rightward direction) and yh in y-axis direction (downward direction) from coordinates (xp,yp) as an upper left corner corresponds to the print sheet Rb.

Further, the print area of the page specified by the print spec and the margin is denoted by Rp. In the area Rb (print sheet), an area except xm from the both (left and right) ends of the x-axis and except ym from the both (up and down) ends of the y-axis corresponds to the print area Rp.

In this case, a border line xb on the right side of the page is calculated from the following expression.

$$xb = xp + xw - xm$$

For example, in a sticky note F, when a right end portion of the sticky note determined by the sticky note position and the sticky note size in the sticky note data is equal to or greater than border line xb, it is determined that the sticky note F runs off the print area Rp in the rightward direction. When it is determined that the sticky note F runs off the border, the processing controller 15 controls the printing controller 17 in correspondence with the protruded portion, to move a description in the portion into space Rf in the print area Rp in the sticky note F then perform printing.

Figure 5A:
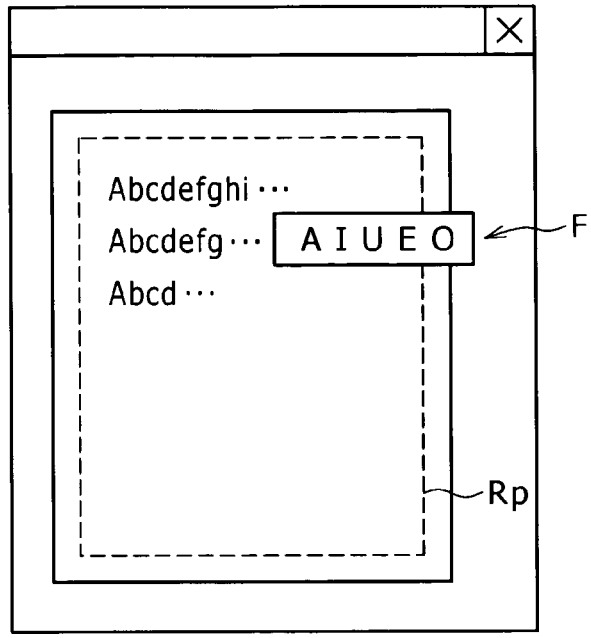
FIGS. 5A and 5B are explanatory views of control of printing processing according to the exemplary embodiment of the present invention.
Figure 5B:
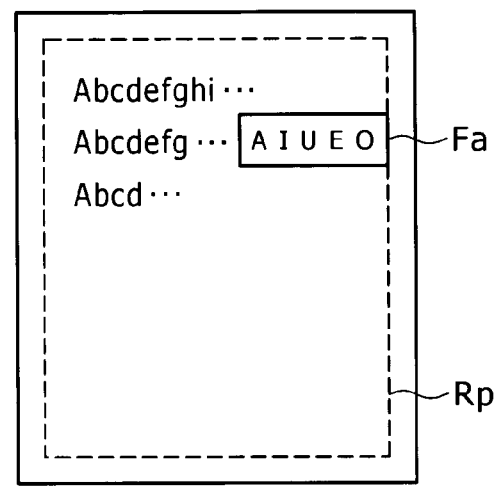

As a result, even upon printing of a page as shown in FIG. 5A where the sticky note F runs off the print area Rp, the description in the sticky note F can be printed without being omitted as a form Fa where the description in the sticky note F is moved into the print area Rp as shown in FIG. 5B (in the present exemplary embodiment, into empty space ensured by reducing the character size).

Figure 6A:
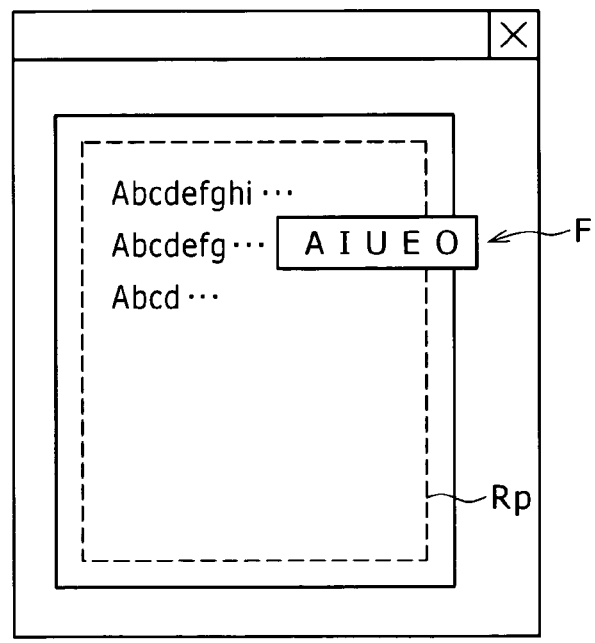
FIGS. 6A and 6B are explanatory views of other control of the printing processing according to the exemplary embodiment of the present invention.
Figure 6B:
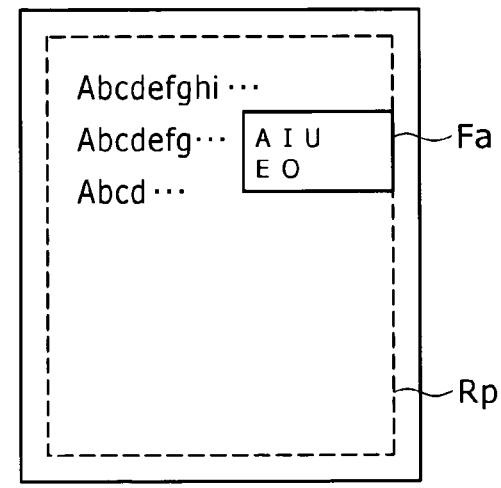

FIGS. 6A and 6B show other control of the printing processing. As shown in FIG. 6B, the processing controller 15 controls the printing processor 17 to change the form of the sticky note F, thereby the description in the sticky note F is printed as a form Fb where the description is moved into the print area Rp. Further, it may be arranged such that the sticky note F and its description are reduced to be included in the print area Rp while the form of the sticky note F is maintained.

Figure 7:
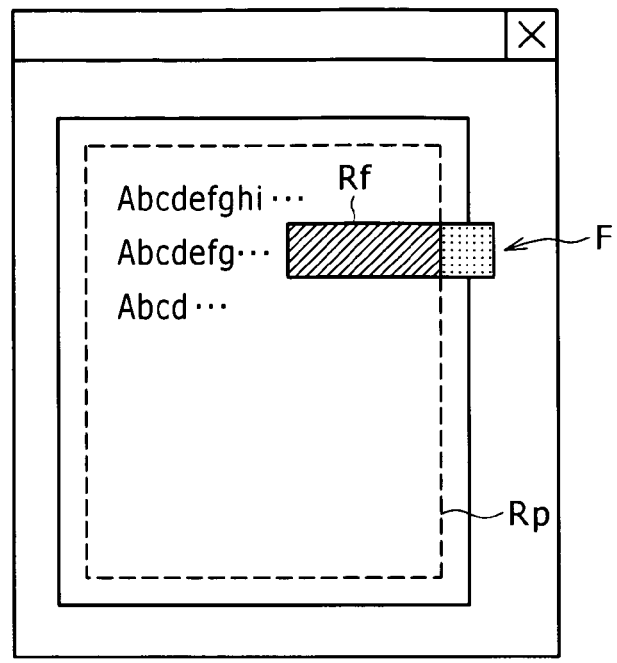
FIG. 7 is an explanatory view of control of editing processing according to the exemplary embodiment of the present invention.

As shown in FIG. 7, the processing controller 15 may control the editing processor 19 to define the description to be held in the sticky note F in space Rf in the print area Rp in the sticky note F. That is, for example, an input of description with respect to the space Rf in the print area Rp in the sticky note F is accepted while an input with respect to a portion running off the print area Rp in the sticky note F is disabled, or a warning message is displayed upon such input with respect to the portion running off the print area. Thus, the description is controlled within the print area Rp.

Figure 8:
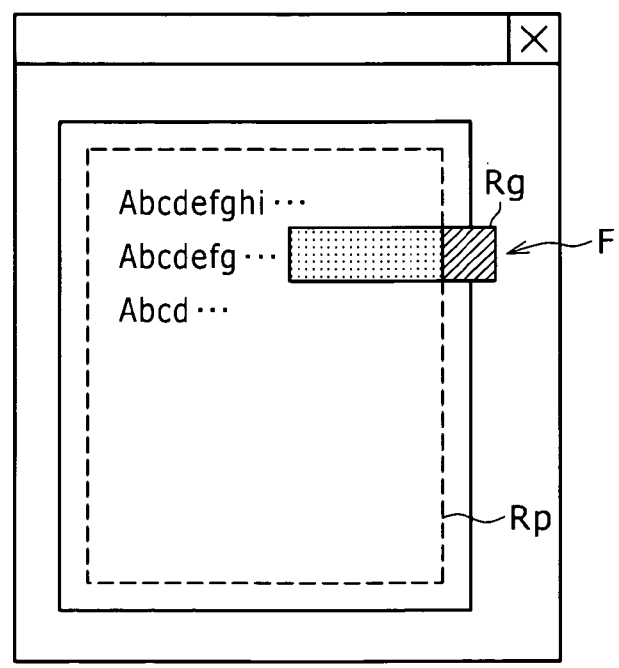
FIG. 8 is an explanatory view of control of display processing according to the exemplary embodiment of the present invention.

Further, as shown in FIG. 8, the processing controller 15 may control the display processor 18 to produce a display where the portion within the print area Rp in the electronic sticky note F and a portion Rg running off the print area Rp are distinguished from each other (in the present exemplary embodiment, the portion Rg is gray-out displayed). In this manner, the user is informed that a description in the portion Rg running off the print area cannot be printed and advised not to input the description in the portion Rg.

Note that in the present exemplary embodiment, the area specifying unit 14, the processing controller 15, the printing processor 17, the display processor 18 and the editing processor 19 are implemented by execution of a program according to the present invention using hardware resources such as a central processing unit (CPU) and a memory of a computer. However, these elements may be implemented using specialized circuit elements.

FIG. 9 shows the construction of the printer 2 according to another exemplary embodiment of the present invention.

The printer 2 performs printing on a print sheet based on page data and sticky note data supplied from another apparatus. The printer 2 has a sticky note controller 21 which performs print control, a printing processor 25 which performs processing to generate print information based on the page data and the sticky note data, and a printing unit 26 which performs printing on a print sheet based on the generated print information.

The sticky note controller 21 has a spec holder 22 which holds print spec as information on an unprintable area caused by a mechanical factor of the printing unit 26, an area specifying unit 23 which specifies a print area based on the print spec and the page size, and a processing controller 24 which controls the printing processor 25 in correspondence with a portion running off the specified print area.

In the printer 2 of the present exemplary embodiment, when page data and sticky note data are supplied, the area specifying unit 23 specifies a print area based on the print spec and the page data. Then the processing controller 24 calculates the border of the print area from which a sticky note attached to the page runs off the print area, from the sticky note data and the specified print area. The processing controller 24 controls the printing unit 26 based on the border to generate print information where the description in the sticky note is included in the print area so that the printing unit 26 performs printing based on the print information.

That is, as the printing processing is controlled on the printer 2 side, it is not necessary for the respective units which supply the page data and the sticky note data to perform processing to move the description in the sticky note into the print range of the page.

Note that in the present exemplary embodiment, the area specifying unit 23, the processing controller 25 and the printing unit 26 are implemented by execution of a program according to the present invention using hardware resources such as a central processing unit (CPU) and a memory of the printer 2. However, these elements may be implemented using specialized circuit elements.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising: an area specifying unit that specifies a print area to be printed on a print medium in a page of a document; a processing controller that controls processing related to an electronic sticky note added to the page of the document, in correspondence with a portion which is out of the print area in the electronic sticky note, to arrange a description held in the electronic sticky note within the print area; and a display processor that displays both a portion within the print area and a portion out of the print area within the electronic sticky note so that the portion within the print area and the portion out of the print area are distinguished, wherein if there is the portion which is out of the print area, the processing controller controls a printing processor that performs printing the electronic sticky note on the print medium, to move the description in the portion into the print area and perform printing, wherein the portion out of the print area is gray-out displayed in order to distinguish the portion out of the print area from the portion within the print area.

2. The information processing apparatus according to claim 1, wherein the printing processor changes a form of the electronic sticky note thereby to move the description in the portion into the print area, in accordance with control by the processing controller.

3. The information processing apparatus according to claim 1, wherein the printing processor reduces a character size of the description in the electronic sticky note thereby to move the description in the portion into the print area, in accordance with control by the processing controller.

4. The information processing apparatus according to claim 1, further comprising:
an editing processor that edits the description in the electronic sticky note in correspondence with a user's operation and controls the description written in the electronic sticky note to be held within the print area in the electronic sticky note.

5. The information processing apparatus according to claim 1, wherein:
the display processor that displays the electronic sticky note on a screen for editing the description in the electronic sticky note in correspondence with a user's operation, and controls the display so that the portion within the print area in the electronic sticky note and the portion out of the print area are distinguished from each other.

6. A document processing apparatus comprising: a display processor that displays a page in a document and an electronic sticky note attached to the page on a screen; a printing processor that generates print information to print the page and the electronic sticky note and supplies the print information to a printer, to cause the printer to perform printing on a print medium; an area specifying unit that specifies a print area to be printed on the print medium in the page; a processing controller that controls the printing processor, if there is a portion which is out of the print area in the electronic sticky note, to generate print information where the description in the portion is moved within the print area; and a display processor that displays both a portion within the print area and a portion out of the print area within the electronic sticky note so that the portion within the print area and the portion out of the print area are distinguished, wherein the portion out of the print area is gray-out displayed in order to distinguish the portion out of the print area from the portion within the print area.

7. A document processing apparatus comprising: a display that displays a page in a document and an electronic sticky note attached to the page on a screen; an editing processor that edits a description written in the electronic sticky note in correspondence with a user's operation; a printing processor that generates print information to print the page and the electronic sticky note and supplies the print information to a printer, to cause the printer to perform printing on a print medium; an area specifying unit that specifies a print area to be printed on the print medium in the page; a processing controller that controls the editing processor, in correspondence with a portion which is out of the print area in the electronic sticky note, to control the description written in the electronic sticky note to be held within the print area in the electronic sticky note; and a display processor that displays both a portion within the print area and a portion out of the print area within the electronic sticky note so that the portion within the print area and the portion out of the print area are distinguished, wherein if there is the portion which is out of the print area, the processing controller controls a printing processor that performs printing the electronic sticky note on the print medium, to move the description in the portion into the print area and perform printing, wherein the portion out of the print area is gray-out displayed in order to distinguish the portion out of the print area from the portion within the print area.

8. A document processing apparatus comprising: a display that displays a page in a document and an electronic sticky note attached to the page on a screen; an editing processor that edits a description written in the electronic sticky note in correspondence with a user's operation; a printing processor that generates print information to print the page and the electronic sticky note and supplies the print information to a printer, to cause the printer to perform printing on a print medium; an area specifying unit that specifies a print area to be printed on the print medium in the page; and a processing controller that controls the display, in correspondence with a portion which is out of the print area in the electronic sticky note, to display both a portion within the print area and a portion out of the print area within the electronic sticky note so that the portion within the print area in the electronic sticky note and a portion out of the print area in the electronic sticky note are distinguished from each other, wherein if there is the portion which is out of the print area, the processing controller controls a printing processor that performs printing the electronic sticky note on the print medium, to move the description in the portion into the print area and perform printing, wherein the portion out of the print area is gray-out displayed in order to distinguish the portion out of the print area from the portion within the print area.

9. A printing apparatus comprising: a printing processor that performs processing to print a page in a document and an electronic sticky note attached to the page on a print medium; an area specifying unit that specifies a print area to be printed on the print medium in the page; a processing controller that controls the printing processor, if there is a portion which is out of the printing area in the electronic sticky note, to move a description in the portion into the print area and perform printing; and a display processor that displays both a portion within the print area and a portion out of the print area within the electronic sticky note so that the portion within the print area and the portion out of the print area are distinguished, wherein the portion out of the print area is gray-out displayed in order to distinguish the portion out of the print area from the portion within the print area.

10. A non-transitory computer readable medium storing an information processing program causing a computer to execute a process for information processing, the process comprising: specifying a print area to be printed on a print medium in a page of a document; controlling processing related to an electronic sticky note, in correspondence with a portion which is out of the print area in the electronic sticky note attached to the page, to arrange a description written in the electronic sticky note to be held in the print area; and displacing both a portion within the print area and a portion out of the print area within the electronic sticky note so that the portion within the print area and the portion out of the print area are distinguished, wherein if there is the portion which is out of the print area, the processing controller controls a printing processor that performs printing the electronic sticky note on the print medium, to move the description in the portion into the print area and perform printing, wherein the portion out of the print area is gray-out displayed in order to distinguish the portion out of the print area from the portion within the print area.

11. A non-transitory computer readable medium storing a document processing program causing a computer to execute a process for document processing, the process comprising: displaying a page in a document and an electronic sticky note attached to the page on a screen; generating print information to print the page and the electronic sticky note and supplying the print information to a printer, to cause the printer to perform printing on a print medium; specifying a print area to be printed on the print medium in the page; controlling the printing processing, if there is a portion which is out of the print area in the electronic sticky note, to generate print information where the description in the portion is moved within the print area; and a display processor that displays both a portion within the print area and a portion out of the print area within the electronic sticky note so that the portion within the print area and the portion out of the print area are distinguished wherein the portion out of the print area is gray-out displayed in order to distinguish the portion out of the print area from the portion within the print area.

12. A non-transitory computer readable medium storing a document processing program causing a computer to execute a process for document processing, the process comprising: displaying a page in a document and an electronic sticky note attached to the page on a screen; editing a description held in the electronic sticky note in correspondence with a user's operation; generating print information to print the page and the electronic sticky note and supplying the print information to a printer, to cause the printer to perform printing on a print medium; specifying a print area to be printed on the print medium in the page; controlling the editing processing, in correspondence with a portion which is out of the print area in the electronic sticky note, to regulate the description written in the electronic sticky note to be hold within the print area in the electronic sticky note; and displaying both a portion within the print area and a portion out of the print area within the electronic sticky note so that the portion within the print area and the portion out of the print area are distinguished, wherein if there is the portion which is out of the print area, the processing controller controls a printing processor that performs printing the electronic sticky note on the print medium, to move the description in the portion into the print area and perform printing, wherein the portion out of the print area is gray-out displayed in order to distinguish the portion out of the print area from the portion within the print area.

13. A non-transitory computer readable medium storing a document processing program causing a computer to execute a process for document processing, the process comprising: displaying a page in a document and an electronic sticky note attached to the page on a screen; editing a description written in the electronic sticky note in correspondence with a user's operation; generating print information to print the page and the electronic sticky note and supplying the print information to a printer, to cause the printer to perform printing on a print medium; specifying a print area to be printed on the print medium in the page; and controlling the display processing, in correspondence with a portion which is out of the print area in the electronic sticky note, to display both a portion within the print area and a portion out of the print area within the electronic sticky note so that a portion within the print area in the electronic sticky note and a portion out of the print area in the electronic sticky note are distinguished from each other, wherein if there is the portion which is out of the print area, the processing controller controls a printing processor that performs printing the electronic sticky note on the print medium, to move the description in the portion into the print area and perform printing, wherein the portion out of the print area is gray-out displayed in order to distinguish the portion out of the print area from the portion within the print area.

14. A non-transitory computer readable medium storing a printing program causing a computer to execute a process for printing, the process comprising: printing a page in a document and an electronic sticky note attached to the page on a print medium; specifying a print area to be printed on the print medium in the page; controlling the printing processing, if there is a portion which is out of the printing area in the electronic sticky note, to move a description in the portion into the print area and perform printing; and displaying both a portion within the print area and a portion out of the print area within the electronic sticky note so that the portion within the print area and the portion out of the print area are distinguished, wherein the portion out of the print area is gray-out displayed in order to distinguish the portion out of the print area from the portion within the print area.

* * * * *